United States Patent
Fichter et al.

(10) Patent No.: US 8,027,141 B2
(45) Date of Patent: Sep. 27, 2011

(54) PROCESS AND SYSTEM FOR DISCHARGING A TEST MASS FREE-FLOATING IN A SATELLITE

(75) Inventors: Walter Fichter, Constance (DE); Fabio Montemurro, Matera (IT); Tobias Ziegler, Constance (DE)

(73) Assignee: Astrium GmbH, Munich (DE)

( * ) Notice: Subject to any disclaimer, the term of this patent is extended or adjusted under 35 U.S.C. 154(b) by 512 days.

(21) Appl. No.: 12/261,578

(22) Filed: Oct. 30, 2008

(65) Prior Publication Data
US 2009/0116163 A1 May 7, 2009

(30) Foreign Application Priority Data
Oct. 31, 2007 (DE) .......................... 10 2007 052 409

(51) Int. Cl.
*H05F 3/00* (2006.01)
(52) U.S. Cl. ....................................................... 361/216
(58) Field of Classification Search ................... 361/216
See application file for complete search history.

(56) References Cited

U.S. PATENT DOCUMENTS

| | | | |
|---|---|---|---|
| 6,362,574 B1 | 3/2002 | Aguero et al. | |
| 6,545,853 B1 | 4/2003 | Gelderloos et al. | |
| 6,606,908 B2 * | 8/2003 | Johann et al. | 73/514.19 |
| 2002/0036251 A1 | 3/2002 | Johann et al. | |

FOREIGN PATENT DOCUMENTS

| | | |
|---|---|---|
| DE | 10031542 A1 | 1/2002 |
| EP | 0488973 A1 | 6/1992 |

OTHER PUBLICATIONS

R. Gerndt, et al., "LISA Technology Package System Design and Operations", AIP Conference Proceedings, Laser Interferometer Space Antenna: 6th International Lisa Symposium, Nov. 29, 2006, pp. 668-674, XP002516351.
S. Anza et al., "The LTP experiment on the 1-14 LISA Pathfinder mission", Classical and Quantum Gravity, Institute of Physics Publishing, 2005, pp. S125-S138, XP002516352.
T. J. Sumner et al., "The radiation environment for the Lisa and MiniStep missions and test mass charge control", Advances in Space Research, pp. 1219-1223, XP002516353.
European Search Report including English translation dated Mar. 6, 2009 (Thirteen (13) pages).

* cited by examiner

*Primary Examiner* — Stephen W Jackson
(74) *Attorney, Agent, or Firm* — Crowell & Moring LLP

(57) ABSTRACT

In a process for discharging a test mass that is free-floating in a surrounding electrode casing on board a satellite, the electrode casing is enclosed by a vacuum tank, and has one or more first electrodes for the application of electrostatic forces and/or moments to the test mass. In addition, the electrode casing also has one or more second electrodes for modulating alternating voltages (particularly, high frequency voltages) for measuring purposes onto the test mass as well as one or more light-emitting elements, which irradiate the test mass, the electrode casing and/or the electrodes particularly with ultraviolet light for generating a photoelectric effect. Automatically and iteratively, a test mass charge of the test mass is determined. A control operation for eliminating the determined test mass charge is carried out until the test mass charge has reached a defined target value.

14 Claims, 4 Drawing Sheets

PROCESS AND SYSTEM FOR DISCHARGING A TEST MASS FREE-FLOATING IN A SATELLITE

BACKGROUND AND SUMMARY OF THE INVENTION

This application claims the priority of German patent document 10 2007 052 409.0, filed Oct. 31, 2007, the disclosure of which is expressly incorporated by reference herein.

The invention relates to a process and a system for discharging a free-floating test mass that is surrounded by an electrode casing in a satellite.

In the so-called LISA (laser interferometry space antenna) program, three satellites are positioned in space at the corners of an equilateral triangle having a side length of 5 million kilometers. Each satellite is equipped with two test masses or test cubes made of a metal alloy (Au/Pt), which are maintained in a floating state by means of a very precisely controllable electrostatic field. The test masses are charged as a result of cosmic radiation or, during the release of a mechanical holding device, are provided with an electric charge to achieve the free-floating state. To avoid interference forces which are generated in an electric field because of charging and which negatively influence the actual measurements, it is to be ensured that the test masses are discharged. Moreover, in order to maximize the time available for the actual measurement, the discharge should take place as fast as possible.

For discharging the test masses, it is known to estimate the charge of the test mass by applying voltages by via so-called control electrodes which surround the test mass. The movement of the test mass caused by the voltage application is determined, and a conclusion can be drawn from the amplitude and phase of the movement concerning the charge. The test mass and the casing surrounding the test mass including the control electrodes are exposed to ultraviolet light, with the photoelectric effect being utilized here. Finally, direct voltages are applied to the control electrodes in order to assist the charge transfer. To discharge the test mass, control commands determined for this purpose from a control computer situated on the ground are required at the control unit of the satellite. The discharging is therefore performed more or less manually, and it is therefore time-consuming and imprecise.

It is therefore an object of the present invention to provide a process and a system for discharging a free-floating test mass in a satellite, which permit more precise discharging of the test mass, in a simpler manner.

This and other objects and advantages are achieved by the process according to the invention, in which the electrode casing, enclosed by a vacuum tank, has one or more electrodes for applying electrostatic forces and/or moments to the test mass and one or more second electrodes for modulating, particularly high-frequency, alternating voltages for measuring purposes onto the test mass. By means of modulated-on alternating voltages, the electrodes can be used for the application of electrostatic forces and moments also for the electrostatic measuring of the test mass position and/or of the test mass orientation.

The electrode casing also comprises one or more light-emitting elements which expose the test mass, the electrode casing, and/or the electrodes to radiation, particularly by means of ultraviolet light, for generating a photoelectric effect. A test mass charge is determined automatically and iteratively, and a control operation is carried out for eliminating the determined test mass charge until the test mass charge has reached a defined target value.

By means of the process according to the invention, the test mass floating freely in a satellite can be automatically discharged onboard the satellite. The discharge can be performed rapidly in a time-optimized manner, so that the time available for the scientific measuring period is increased. The process as well as the system are robust with respect to uncertainties of the used hardware components (particularly the light-emitting elements) as well as with respect to additional interference effects, such as modulation voltages, which are used for electrostatic measurement and control or actuation of the test mass. In addition to rapidly discharging the test mass, the invention has the advantage that no ground-side expenditures are required. The ruggedness of the process of the rapid test mass discharge results in high reliability and precision.

The invention also includes a computer program product encoded with machine-readable program commands for a control unit of a data carrier, which cause the control unit to implement the process according to the invention. The computer program product according to the invention may be a physical medium with stored program commands, such as a semiconductor memory, a floppy disk or a CD-ROM. The computer program product may also be a non-physical medium, such as a signal transmitted by way of a computer network.

Finally, the invention also provides a system for discharging a free-floating test mass surrounded by an electrode casing of the above-described type in a satellite, including devices for implementing the process according to the invention. These have the same advantages as explained in connection with the method according to the invention.

Other objects, advantages and novel features of the present invention will become apparent from the following detailed description of the invention when considered in conjunction with the accompanying drawings.

DETAILED DESCRIPTION OF THE DRAWINGS

In the figures, reference symbols are often followed by indexes. In the description which follows, these are shown either in the style corresponding to the figures or, as an alternative, by a "_" followed by the letters and numbers of the index. These two different styles indicate the same parameter.

Figure 1:
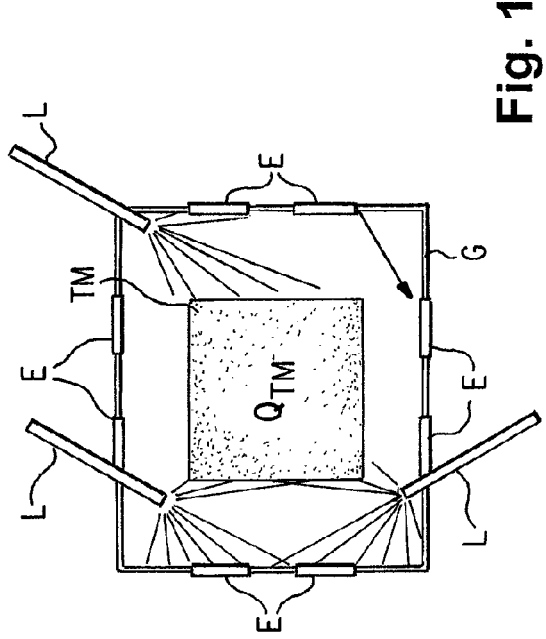
FIG. 1 is a schematic view of a system for discharging a free-floating test mass in a satellite.

FIG. 1 is a schematic depiction of a system according to the invention, with the essential components necessary for implementing the process for the rapid automatic discharging of a test mass TM floating freely in a satellite. The test mass TM is surrounded by an electrode casing G, which in turn is enclosed by a vacuum tank (not shown). A number of electrodes E are arranged on the electrode casing G. In the example, two electrodes E respectively are arranged opposite a respective main side of the test mass TM. The electrodes are used for electrostatic measurement and control (i.e., the application of electrostatic forces and moments to the test mass TM). Additional electrodes (not shown in FIG. 1) are used for modulating-on high-frequency alternating voltages for measuring purposes in order to separate the measuring and the controlling. The former electrodes E are called control electrodes; the latter are called injection electrodes. The application of electrostatic forces and/or moments as well as high-frequency alternating voltages for measuring purposes may take place by correspondingly triggering respective electrodes E. Furthermore, the schematic view of FIG. 1 shows as an example three ultraviolet lamps L, which radiate onto the test mass or onto the casing G and some of the electrodes E.

The test mass TM is formed of an AuPt alloy. It floats freely in the electrode casing G which is arranged in a satellite. This means that the test mass TM has no contact with the electrode casing G, so that the test mass is electrically charged and insulated. The electrode casing G includes the electrodes E for application of voltages required for the process. The remaining part of the electrode casing G has a 0 potential with respect to the electrodes.

Sinusoidal test signal voltages, for example, which can be applied to the control electrodes E, are used in the manner of an actuating element, permitting an estimation of the charge Q_TM of the test mass TM (hereinafter also referred to as the test mass charge). Furthermore, constant voltages may be applied to the control electrodes to assist or accelerate a charge transfer. Depending on whether electrons are emitted from the electrode casing G, the electrodes E or the surface of the test mass TM, the emitted electrons are transferred from the electrode casing G to the test mass TM or from the test mass TM to the electrode casing G.

In addition to the control electrodes, the injection electrodes are provided for applying an alternating voltage of a high frequency (100 Hz) for measuring purposes. By means of the modulated-on alternating voltage, the control electrodes can be used for measuring coordinates of the test mass TM in a predefined coordinate system.

An electrostatic control and measurement is uncoupled by way of the injection voltage and is simultaneously available for each scanning step, which takes place, for example, with 10 Hz.

A photoelectric effect can be generated by means of the UV lamps, in which electrons are emitted from the surface irradiated by the UV lamps. As a result, a charge flow $\dot{Q}\_TM$) relative to the test mass TM (also called a discharge rate) is generated: UV lamps L, which predominantly irradiate the test mass TM, generate a positive discharge rate $\dot{Q}\_TM+$, and UV lamps, which shine mainly on the electrodes or the casing generate a negative discharge rate $\dot{Q}\_TM-$).

Figure 2:
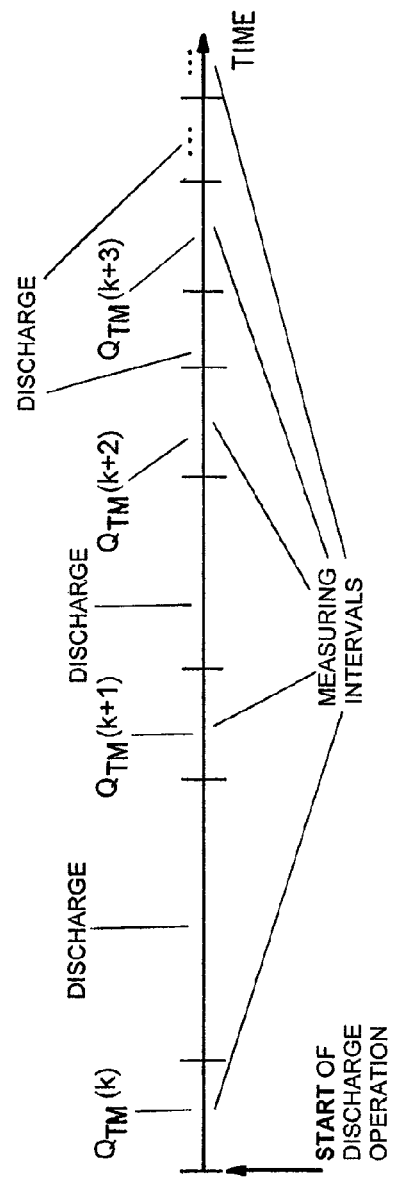
FIG. 2 is a time line which shows the sequence of the automatic discharge operation of the test mass.

The time sequence of an automatically implemented discharge operation of the test mass TM is illustrated schematically in FIG. 2, in which the operation of the discharge consists of two repetitive operations:
1. Determination of the charge Q_TM on the test mass TM by charge estimation;
2. control operation for eliminating the determined test mass charge Q_TM.

In this case, the determination of the charge and the discharging of the test mass TM are separated with respect to time; i.e., they take place successively.

After each measuring interval MT (also called an estimation interval), the test mass charge Q_TM(k), Q_TM(k+1), is available (k indicating a first measuring interval, k+1 indicating a subsequent measuring interval, etc.). As soon as the test mass charge is known, the control operation can be performed for discharging the test mass TM. To this end, either the test mass or the electrode casing G and the electrodes E are illuminated with UV light and a corresponding DC voltage is applied. Both control parameters are a function of the determined preceding sign of the test mass charge Q_TM.

As is easily recognizable in FIG. 2, the measurement of the test mass charge and the control operation for discharging the test mass TM are repeated continuously and sequentially. The automatic discharge is terminated as soon as a defined target value or control value for the test mass charge has been reached. A selected threshold value may, for example, be a test mass charge of less than 106 unit charges.

Charge Measurement

Figure 3:
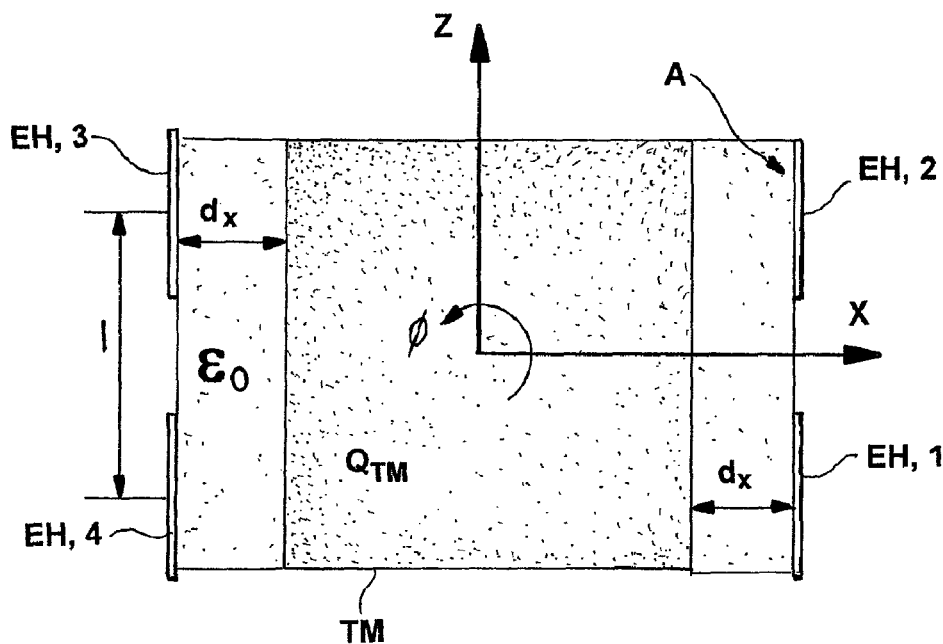
FIG. 3 is a schematic view of the arrangement of the test mass and the electrodes for a charge estimation along an x-axis in a coordinate reference system.

The test mass charge is estimated in a contactless manner, for example by means of a condition estimate or a parameter estimate. For this purpose, for example, sinusoidal voltages V(t) are applied to the electrodes E as test signals, so that a force or a moment is generated upon the test mass TM proportional to the existing test mass charge Q_TM. The mathematical relationship $$F_x^Q = 4 \cdot \epsilon_0 \cdot A/(c_{tot} \cdot d_x^2) \cdot Q_{TM} \cdot V(t),$$

for example, applies to the force which is generated in the x-direction. In this expression, A is the surface of an electrode; $\epsilon 0$ is the electricity constant of the vacuum; $c_{tot}$ is the total capacitance of all existing plate capacitors; and dx is the nominal distance between the test mass TM and a respective electrode EH,1, EH,2, EH,3 and EH,4. This is schematically illustrated in FIG. 3, which demonstrates that each of the electrodes EH,1, EH,2, EH,3 and EH,4, together with the surface of the test mass TM situated on the opposite side, in an idealized viewing manner, forms a plate capacitor which has a respective capacitance.

The movement of the test mass TM generated by the force or the moment is measured. The measurement can be carried out by means of an electrostatic measuring system or an optical measuring system (not shown). The charge of the test mass Q_TM can then be determined from the commanded voltages and the measured movement of the test mass. The estimation algorithms for the charge determination are data recursively formulated, and are used to process the commanded test signals and the measured position or of the test mass onboard the satellite. The estimate of the charge of the test mass is therefore available and can be processed immediately after the measuring interval onboard the satellite.

Discharge

When the charge $Q_{TM}(k)$ of the test mass TM is known, the time required for the discharge can be calculated. For calculating the discharge time $t_{discharge}$, the knowledge of the nominal discharge rate $\dot{Q}\_TM\_nom$ is required. The discharge time is calculated as follows:

$$t_{discharge} = \frac{Q_{TM}(k)}{\dot{Q}_{TM}^{nom}}. \tag{1}$$

The calculated discharge time is a function of the size of the test mass charge and of the nominal discharge rate. However, the nominal discharge rate Q_TM_nom is not precisely known and does not correspond to the real discharge rate $\dot{Q}\_TM\_real$. Also, the discharge rate without the application of constant acceleration voltages to the electrodes does not correspond to the maximum possible value.

For this purpose, constant voltages are first applied to the electrodes such that the discharge rate becomes maximal. In addition, correction measures are carried out for a better determination and knowledge of the discharge rate. Finally, the discharge rate is adapted by two successive charge measurements, as described in detail below.

Figure 4:
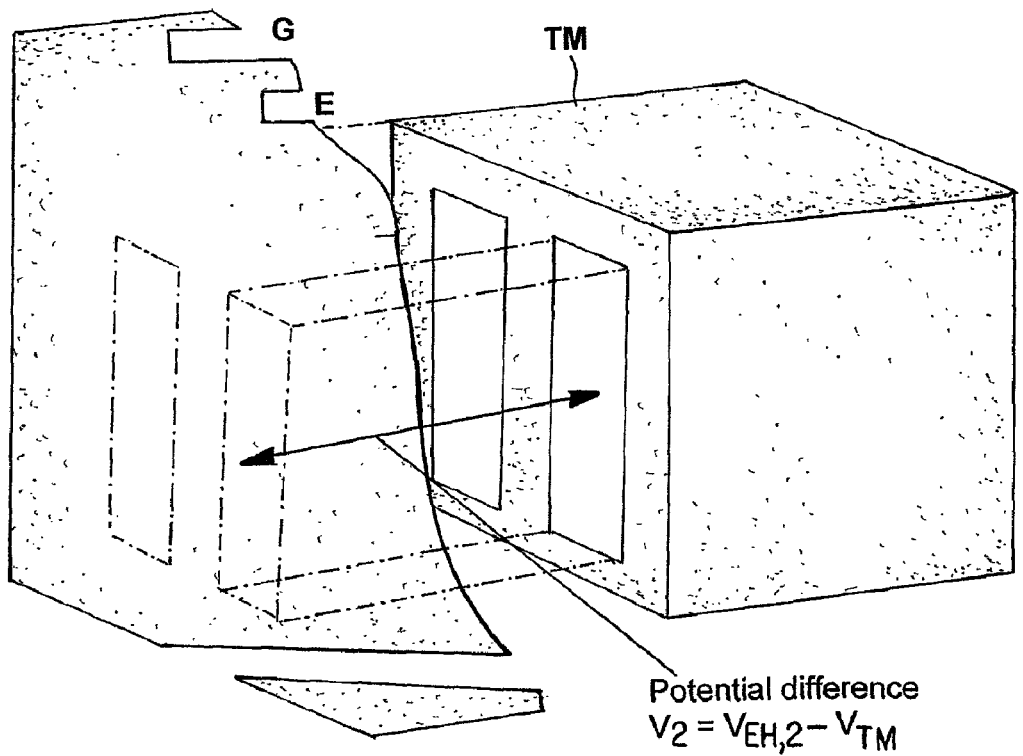
FIG. 4 is a schematic view which illustrates the determination of the potential between individual electrodes or between the electrode casing and the test mass.

1. Application of Constant Voltages to the Electrodes so that the Discharge Rate Becomes Maximal The discharge rate is a function of the potential difference between the test masses and the electrodes E or the electrode casing G. Each of the electrodes E and the electrode casing G form a plate capacitor with the opposing test mass surface, as illustrated as an example in FIG. 4. Two of the illustrated electrodes E, marked EH,1 and EH,2, have a potential $V_{EH,1}$ and $V_{EH,2}$ respectively. The test mass TM has a potential $V_{TM}$, so that a potential difference $V_1 = V_{EH,1} - V_{TM}$ and $V_2 = V_{EH,2} - V_{TM}$ is obtained therefrom, Correspondingly, the potential difference is also determined for the other electrodes E illustrated in FIG. 1 relative to the test mass TM.

The system described here has a total of 14 plate capacitors, four plate capacitors being formed by the electrodes E illustrated in FIG. 1 and the corresponding surfaces of the test mass TM, and another being formed by the combined remaining surfaces of the entire electrode casing G and the corresponding surfaces of the test mass TM. A potential difference Vn can therefore be indicated for each of the plate capacitors, wherein n=1 to 14.

Figure 5:
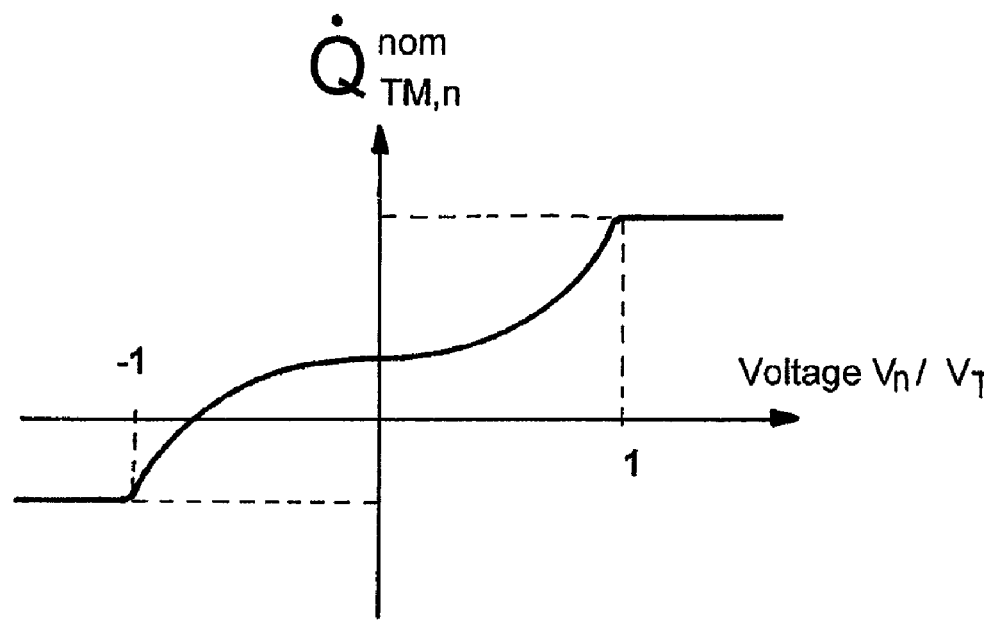
FIG. 5 is a graphic depiction of the discharge rate as a function of a potential difference of the test mass with respect to an electrode or the casing.

A characteristic curve, which represents the discharge rate as a function of the respective potential difference Vn, exists for each of the electrodes E and for the electrode casing G, and thus for the total of the 14 plate capacitors. This is illustrated by an example in FIG. 5. The potential difference of the individual electrodes or the casing with respect to the test mass TM is $V_n = V_{EH,n} - V_{TM}$. In this case, VTM represents the potential of the test mass TM and $V_{EH,n}$ represents the potential of the corresponding electrode n or the combined casing sides of the entire casing. A threshold value $V_T$ exists for each potential difference $V_n$. No further increase of the discharge rate $\dot{Q}_{TM,n}^{nom}$ can be achieved beyond this threshold value.

The total discharge rate $\dot{Q}_{TM}^{nom}$ for the test mass TM is obtained from the sum of the individual discharge rates $\dot{Q}_{TM,n}^{nom}$ for n=1 to 14:

$$\dot{Q}_{TM}^{nom} = \sum_{n=1}^{14} \dot{Q}_{TM,n}^{nom}. \tag{2}$$

The discharge rate $\dot{Q}_{TM}^{nom}$ should reach the maximum possible value. This means that, on the characteristic curve illustrated in FIG. 5, one should be on the other side of the threshold values $-V_T$ or $V_T$, as a function of whether a positive or a negative discharge rate is required. For this reason, constant voltages $V_{Dc,i}$ are be applied to selected control electrodes, so that the following relationships will be achieved.

In the case of a positively charged test mass TM, a negative $\dot{Q}_{TM,n}^{nom}$ will be required; the following therefore applies:

$$V_n < -V_T \tag{3}.$$

In the case of a negatively charged test mass, a positive $\dot{Q}_{TM,n}^{nom}$ will be required; and the following therefore applies:

$$V_n \geq V_T \tag{4}.$$

Because of the relationship for the potential differences as a function of the potential of the control electrodes, equations (3) and (4) cannot be met for all 14 of the capacitors. Specifically, constant voltages VDC,i can be applied only to the control electrodes but not to the casing and to injection electrodes. This fact is expressed by equation (5):

$$\begin{pmatrix} V_1 \\ V_2 \\ \vdots \\ V_{12} \end{pmatrix} = \begin{bmatrix} 1-c_1 & -c_2 & \ldots & -c_{12} \\ -c_1 & 1-c_2 & \ldots & -c_{12} \\ \vdots & & \ddots & \vdots \\ -c_1 & -c_2 & \ldots & 1-c_{12} \end{bmatrix} \begin{pmatrix} V_{EH,1} \\ V_{EH,2} \\ \vdots \\ V_{EH,12} \end{pmatrix} \tag{5}$$

$$\approx \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{pmatrix} V_{EH,1} \\ V_{EH,2} \\ \vdots \\ V_{EH,12} \end{pmatrix}$$

$$\begin{pmatrix} V_{13} \\ V_{14} \end{pmatrix} = \begin{bmatrix} -c_1 & -c_2 & \ldots & -c_{12} \\ -c_1 & -c_2 & \ldots & -c_{12} \end{bmatrix} \begin{pmatrix} V_{EH,1} \\ V_{EH,2} \\ \vdots \\ V_{EH,12} \end{pmatrix}.$$

The following applies to the matrix input cn:

$$c_n = \frac{C_n}{C_{tot}},$$

wherein Cn is the capacitance of the plate capacitor n, and Ctot is the total capacitance of all 14 capacitors.

The relationships of equations (3) and (4) can be achieved only for those of the capacitors which are irradiated by much UV light. Relationship (5) shows that the relationships (3) and (4) cannot be achieved for all 14 capacitors. An illumination coefficient exists for each capacitor surface, which expresses the fraction of UV light that impinges on the corresponding surface from a certain UV lamp. The illumination coefficients for all surfaces are known a priori. This knowledge results in uncertainty. Constant voltages VDC,i are therefore applied to the control electrodes of those capacitors which are irradiated by little UV light, so that equations (3) or (4) are met for those capacitors that are irradiated with much UV light. This has the result that the relationships (3) or (4) for capacitors that are irradiated by little UV light are not met or even a false preceding sign of the discharge rate $\dot{Q}_{TM}^{nom}$ is reached. However, this circumstance is not critical because no or very few electrons are emitted anyhow from the corresponding surfaces, on which little or no UV light impinges.

2. Correction Measures for a Better Determination of the Discharge Rate

The potential of the test mass $V_{TM}$ can be calculated as follows:

$$V_{TM} = \frac{Q_{TM} + \sum_{n=1}^{12} C_n \cdot V_{EH,n} + C_{inj} \cdot V_{EH,13}}{C_{tot}}. \quad (6)$$

In this equation, $C_{tot}$ corresponds to the total capacitance (i.e., the sum of all capacitances of the 14 plate capacitors); $V_{EH,13}$ is the voltage which is applied to the injection electrodes; and $C_{inj}$ is the capacitance of the injection electrodes. $V_{EH,1\ldots12}$ are the potentials of the control electrodes. $V_{EH,14}$ corresponds to the potential of the electrode casing G.

Figure 6:
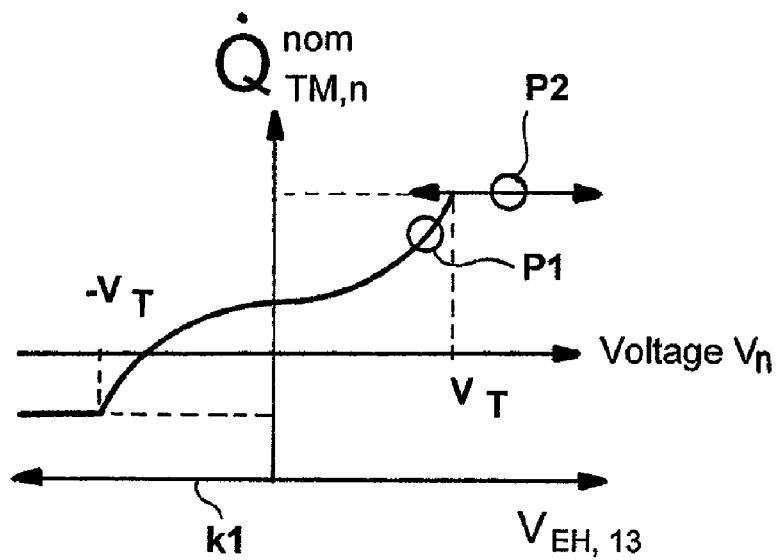
FIG. 6 is a graph that illustrates the influence of an injection voltage for measuring purposes on the discharge rate.

Because of the high-frequency voltage $V_{EH,13}$, despite constant voltages $V_{DC,i}$ applied to the control electrodes, the discharge rate is not always within the range of the maximal discharge range and therefore on the other side of the threshold values $V_T$, because during a period of the high-frequency alternating voltage $V_{EH,13}$, the potential difference $V_n = V_{EH,n} - V_{TM}$ is no longer constantly on the other side of the respective threshold values. This is illustrated in FIG. 6.

The average discharge rate, calculated by averaging over the period of the high-frequency alternating voltage $V_{EH,13}$, is determined taking into account the interfering influences on the basis of the injection voltage for measuring purposes. As a result, the change of the test mass potential $V_{TM}$ due to the high-frequency injection voltage, and thus due to the respective potential differences $V_n$, is taken into account when calculating the discharge rate $\dot{Q}_{TM}^{nom}$. This technique results in a computed discharge rate $\dot{Q}_{TM}^{nom}$, which better corresponds to the actual, so-called derived discharge rate $\dot{Q}_{TM}^{nom}$.

Taking into account the high-frequency alternating voltage, the discharge rate is calculated by:

1. Integration of the function which the discharge rate represents on the basis of the changing potential differences (compare FIG. 6). The integration interval corresponds to the period of the high-frequency alternating voltage (injection voltage).
2. Dividing the integration result by the period of the high-frequency alternating voltage $V_{EH,13}$.

The dependence on the changing potential difference $V_n$ for a plate capacitor on the high-frequency alternating voltage $V_{EH,13}$ is illustrated by $V_n = V_{EH} - V_{TM}$ and equation (6). The changing potential differences $V_n$ are illustrated as a function of the high-frequency injection voltage in equation (7) for all plate capacitors:

$$V_1 = V_{EH,1} - \frac{C_{inj}}{C_{tot}} V_{EH,13} \quad (7)$$

$$\vdots$$

$$V_{12} = V_{EH,12} - \frac{C_{inj}}{C_{tot}} V_{EH,13}$$

$$V_{13} = \left(1 - \frac{C_{inj}}{C_{tot}}\right) V_{EH,13}$$

$$V_{14} = -\frac{C_{inj}}{C_{tot}} V_{EH,13}.$$

In equation (7), the test mass charge QTM and the potentials of the control electrodes weighted with $$\frac{C_n}{C_{tot}}$$

are neglected when calculating the test mass potential $V_{TM}$.

FIG. 6 illustrates the changing discharge rate for a plate capacitor as a function of the changing potential difference $V_n$. P1 marks a point of the characteristic curve which indicates an existing discharge rate at a certain point in time when the injection voltage is switched on for measuring purposes. P2 marks a point of the characteristic curve which represents the desired discharge rate at which no injection voltage is applied for measuring purposes. Furthermore, K1 indicates an injection voltage $V_{EH,13}$ for measuring purposes.

3. Adaptation of the Discharge Rate by Means of Two Successive Charge Measurements The nominal precalculated discharge rate $\dot{Q}_{TM}^{nom}$ differs from the real derived discharge rate $\dot{Q}_{TM}^{real}$ due to the uncertainty of the knowledge of the UV lamps and the uncertainty in the knowledge of the illumination coefficients for the individual surfaces. For this reason, the following approach is necessary: First, the precalculated discharge rate $\dot{Q}_{TM}^{nom}$ during the operation is improved by successive estimation values of the test mass charge. Subsequently, the calculating rule for the discharge time at the maximal discharge rate is adapted by taking into account the improved maximal discharge rate.

Figure 7:
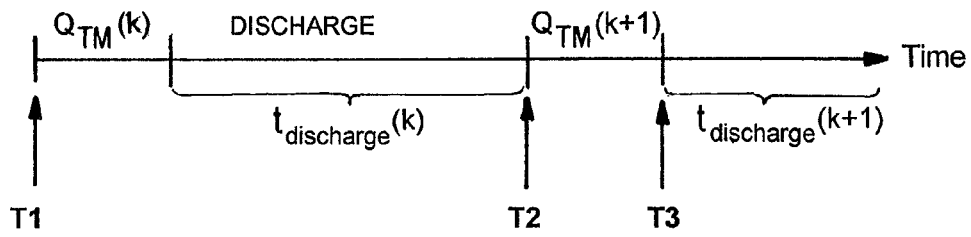
FIG. 7 is a time line that shows the sequence after the start of the discharge operation.

The improvement of the discharge rate will be described first: After the first measuring and control interval, the charge remaining on the test mass is estimated again, which is illustrated in FIG. 7. In this case, T1 marks the starting of the discharge operation. T2 marks the point in time after the first measuring interval. T3 corresponds to the test mass charge Q_TM(k+1) after the second measuring interval. The then available estimated value for the test mass charge is called Q_TM(k+1).

An estimation of the real derived discharge rate $\dot{Q}_{TM}^{real}$ can then be calculated as follows:

$$\dot{Q}_{TM}^{real} = \frac{Q_{TM}(k+1) - Q_{TM}(k)}{t_{discharge}(k)}. \quad (8)$$

The relationship between the precalculated nominal discharge rate $\dot{Q}_{TM}^{nom}$ and the real discharge rate $\dot{Q}_{TM}^{real}$ can be expressed as $$\dot{Q}_{TM}^{real} = k \cdot \dot{Q}_{TM}^{nom} \quad (9).$$

From equations (8) and (9), the following relationship is obtained for the factor k:

$$k = \frac{Q_{TM}(k+1) - Q_{TM}(k)}{t_{discharge}(k) \cdot \dot{Q}_{TM}^{nom}}. \quad (10)$$

Subsequently, the discharge time is calculated using the adapted discharge rate: The following relationship is obtained for the discharge time of the next discharge step while taking into account the adapted discharge rate $k \cdot \dot{Q}_{TM}^{nom}$:

$$t_{discharge}(k+1) = \frac{Q_{TM}(k+1)}{k \cdot \dot{Q}_{TM}^{nom}}. \tag{11}$$

Figure 8:
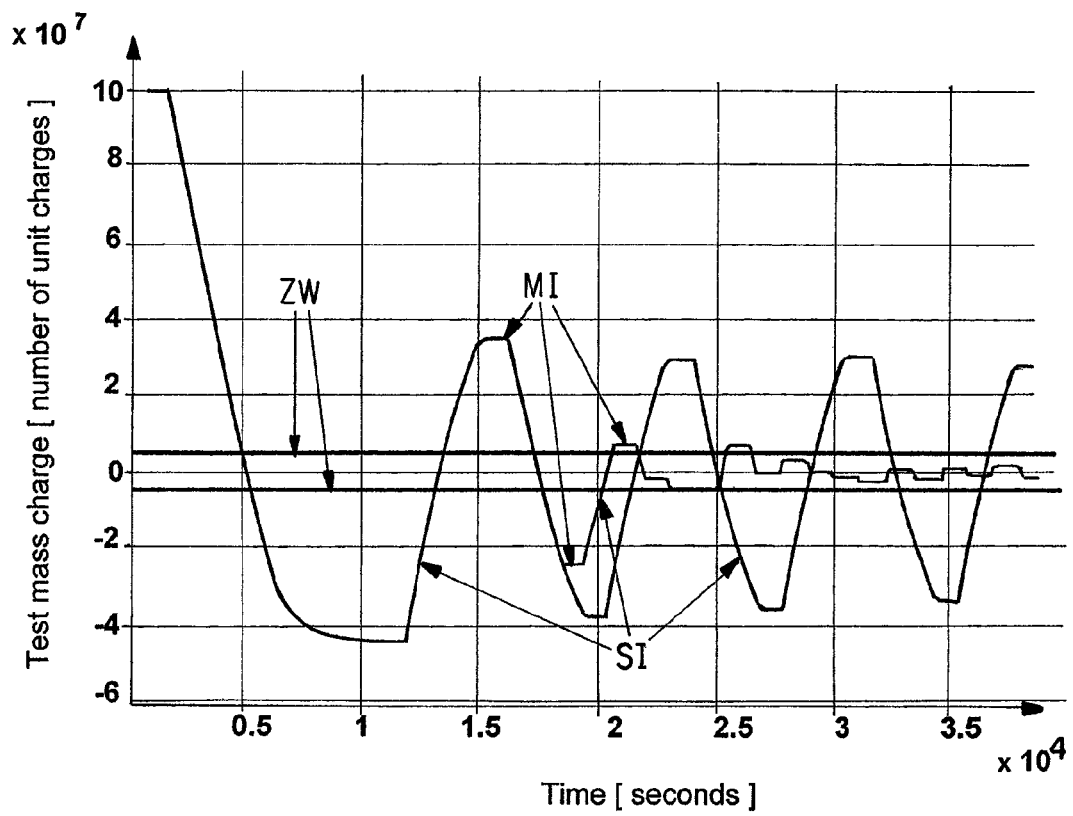
FIG. 8 is a graphic illustration of an example showing the test mass charge the time, with a discharge taking place according to the process of the invention.

As an example, FIG. 8 shows the resulting improvement when using the method according to the invention for the rapid test mass discharge. In the figure, the starting value of the simulated charge on the test mass amounts to $1\times 10^8$ unit charges. The target value for the rapid test mass discharge is at $10^6$ unit charges. (A unit charge corresponds to $1.602\times 10^{19}$ coulomb.) The target value is marked ZW in the figure. M1 indicates the measuring intervals on which the test mass charge has a plateau-like course. S1 indicates control intervals in which an adaptation of the test mass charge takes place. The uncertainties for the discharge rates set in the simulation amount to 70%; i.e., the first assumed discharge rate $\dot{Q}_{TM}^{nom}$ for calculating the discharge time $t_{discharge}$ according to equation (1) has a corresponding error. It is easily recognizable that, even in the case of an extremely large error, after a time of barely 30,000 s, a convergence takes place to the target value ZW.

One advantage of the process according to the invention lies in the fact that this process can be carried out onboard the satellite.

The process, which can be carried out onboard a satellite, will be further described in the following by means of a conceivable algorithm. Here, most steps to be carried out—which are italicized—are supplemented by explanations.

The algorithm is based on the following assumptions:
During the calculations, a differentiation is made between a positive and a negative discharge rate. Positive or negative discharge rates are required depending on the charge condition of the test mass. In this case, the following applies: A negatively charged test mass requires a positive discharge rate; a positively charged test mass requires a negative discharge rate.

When calculating the adaptation factor, a differentiation is made between the adaptation factor for the positive discharge rate "adaptationfactor_p" and the adaptation factor for the negative discharge rate "adaptationfactor_n".

The constant direct voltages for maximizing the discharge rate are applied to the correct electrodes.

A threshold value "AdaptationThreshold" is defined which provides that the adaptation is carried out only when the two last charge estimation values are sufficiently different.

The UV lamps have a minimal switch-on time "t_min", i.e., they have to be switched on at least for the duration t_min.

The algorithm is divided into the following sections:
(1) As soon as a new estimated value QTM exists for the test mass charge, the following actions are carried out once during the first scanning step of the process for the rapid discharge of a test mass implemented onboard of the satellite:
a. The estimated value for the test mass charge [coulomb] is transformed into a corresponding number of unit charges and is stored.

Charge=QEstData/ELEMENTARY_CHARGE b. A counter for the number of estimation cycles of the entire operation for the rapid discharging of the test mass is increased by 1 (starting value of the counter is 0).

NumberOfEstimationCycles=NumberOfEstimationCycles+1 c. First calculation of the required discharge rate is carried out taking into account the estimated charge and the minimal switch-on time which must be observed for the operation of the UV lamps.

qdot_star=−charge/t_min d. Retrieving the precalculated (nominal) positive or negative discharge rates from a memory of an onboard computer. The discharge rates were calculated while taking into account relevant interferences (such as an injection bias for electrostatic measuring).

qdot_max_pos,qdot_max_neg e. Calculation of the real discharge rate as follows:
The current estimate of the test mass charge is positive (or zero) and an adaptation is possible (thus, more is present than an estimate and the difference between a previous estimate and a current estimate is large enough):

WHEN charge>=0 AND NumberOfEistimationCycles>1 AND |charge_old−charge|>AdaptationThreshold, Check whether the preceding estimated value for the test mass charge was positive:

WHEN charge_old>0,

WHEN charge_old>charge, actualize the adaptation factor for the negative discharge rate:

adaptationfactor_n=(charge−charge_old)/(t_disch_old*qdot_max_n);

WHEN charge_old<=charge

No adaptation; use the nominal discharge rate. The reason is that, despite the preceding control operation (by irradiation by UV light and application of constant acceleration voltages to the control electrodes), the currently estimated charge is positive and greater than the preceding (positive) test mass charge (for example, because of the variance of the estimation algorithm in the case of small test mass charges)

adaptation factor_n=1.0;

Check whether the previous estimation value for the test mass charge was negative or zero:

WHEN charge_old<=0, adaptationfactor_p=|charge−charge_old|/(t_disch_old*qdot_max_p)

The current estimation of the test mass charge is positive (or zero) but no adaptation is possible:
OTHERWISE adaptationfactor_n=1

Calculation of the control values (commanded discharge rate and discharge duration) for the test mass discharge (for the case of a demanded negative discharge rate since the current estimation of the test mass charge is positive)

WHEN qdot_star<(qdot_max_n*adaptationfactor_n)

Calculation of the maximal negative commanded discharge rate and of the corresponding discharge time.

$T\_disch = -charge/(qdot\_max\_n * adaptationfactor\_n$ $Qdot\_cmd = qdot\_max\_n$ WHEN $qdot\_star \geq qdot\_max\_n * adaptationfactor\_n$, Calculation of the corresponding discharge rate when the minimal discharge time is required $Qdot\_cmd = qdot\_star$ $t\_disch = t\_min$ The current estimation of the test mass charge is negative and an adaptation is possible:

WHEN Charge<0 AND NumberOfEstimationCycles>1 AND |charge_old−charge|>AdaptationThreshold, Check whether the previous estimation value for the test mass charge was negative:

WHEN charge_old<0,

WHEN charge_old<charge,

Actualize the adaptation factor for the positive discharge rate:

$adaptationfactor\_p = (charge-charge\_old)/(t\_disch\_old * qdot\_max\_p)$

WHEN charge_old>=charge,

No adaptation; use nominal discharge rate. The reason is that, despite the preceding control operation (by irradiation with UV light and application of constant acceleration voltages to the control electrodes) the currently estimated charge is positive and greater than the previous (positive) test mass charge (for example, because of the variance of the estimation algorithm in the case of small test mass charges.

$adaptationfactor\_p = 1.0$

Check whether previous estimation value for the test mass charge was positive:

WHEN charge_old>=0, $Adaptationfactor\_n = |charge-charge\_old|/(t\_disch\_old * qdot\_max\_n)$ The current estimation of the test mass charge is negative, but no adaptation is possible:
OTHERWISE $adaptationfactor\_p = 1$ Calculation of the control values (commanded discharge rate and duration) for the test mass discharge (for the case of a demanded positive discharge rate, since the current estimation of the test mass charge is negative)

WHEN $qdot\_star > +qdot\_max\_p * adaptationfactor\_p$,

Calculation of the maximal positive commanded discharge rate and the corresponding discharge time.

$t\_disch = -charge/(qdot\_max\_p * adaptationfactor\_p)$ $Qdot\_cmd = qdot\_max\_p$ WHEN $qdot\_star < qdot\_max\_p * adaptationfactor\_p$, Calculation of the corresponding discharge rate when the minimal discharge time is needed $Qdpt\_cmd = qdot\_star$ $t\_disch = t\_min$ (2) The following actions are carried out in each scanning step of the process for the rapid discharge of a test mass implemented onboard:
Storage of the following (current) values from step (1) on the onboard computer
Store the currently calculated discharge time t_disch as t_disch_old
Store the current estimation of the charge as charge_old
Calculate the constant acceleration voltages WHEN charge>−0, The constant acceleration voltages Vcmd_TM_DC[i] should be positive and can be applied to the corresponding electrodes (negligible illumination coefficients)

OR WHEN charge<0,

The constant acceleration voltages Vcmd_TM_DC[i] should be negative and be applied to the corresponding electrodes (negligible illumination coefficients)
Lower the calculated discharge time by a scanning step size "sample time":

$t\_disch = t\_disch - sampletime$

When the calculated discharge time has expired, the following commands are set:

WHEN t_disch<0 a. Command for the discharge rate is set to 0: Qdot_cmd=0
b. The constant acceleration voltages are set to 0: Vcmd_TM_DC[i]=0

(3) A new estimation of the test mass charge is carried out.
WHEN new estimation<=defined target value:
Target reached, operation for rapid discharge terminated
WHEN new estimation>defined targeted value:
Continue in Step (1)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| | List of Reference Symbols |
|---|---|
| TM | test mass |
| E | electrode |
| G | electrode casing |
| L | UV lamp |
| EH,1 | electrode |
| EH,2 | electrode |
| EH,3 | electrode |
| EH,4 | electrode |
| I | average distance between two adjacent electrodes |
| A | surface of an electrode |
| $d_x$ | distance between an electrode and the casing of the test mass |
| $\epsilon_0$ | dielectricity constant of vacuum |
| Q_TM | test mass charge |
| Q_TM(k) | test mass charge at the point in time k |
| V_TM | test mass potential |
| V_EH,i | potential of the electrode EH,i |

-continued

List of Reference Symbols

| | |
|---|---|
| Vi | potential difference between the potential of an electrode EH,i and the potential of the test mass TM |
| V_T | threshold value potential |
| Q̇_TM_nom | nominal discharge rate |
| Q̇_TM_real | derived discharge rate |
| ZW | target valu |
| MI | measuring interval |
| SI | control interval |
| t_discharge | discharge time |
| P1 | point on characteristic curve |
| P2 | point on characteristic curve |
| K1 | injection voltage for measuring purposes |
| T1 | condition value in the time sequence |
| T2 | condition value in the time sequence |
| T3 | condition value in the time sequence |

What is claimed is:

1. A process for discharging a test mass that is free-floating inside a surrounding electrode casing on board a satellite, the electrode casing having at least one first electrode for applying electrostatic forces or moments to the test mass and for electrostatic measurement of the position or orientation of the test mass; at least one second electrode for modulating, particularly high-frequency, alternating voltages for measuring purposes on the test mass; and at least one light-emitting element, which irradiates at least one of the test mass, the electrode casing, and the electrodes with ultraviolet light, to generate a photoelectric effect; said processing comprising automatically and iteratively:
   determining a test mass charge of the test mass; and
   performing a control operation to eliminate the determined test mass charge, until the test mass charge has reached a defined target value.

2. The process according to claim 1, wherein the test mass charge of the test mass is determined by a condition or parameter estimation.

3. The process according to claim 1, wherein after the determination of the test mass charge, a discharge time required for the discharge of the test mass is determined.

4. The method according to claim 3, wherein the discharge time is calculated according to $$t_{discharge} = -\frac{Q_{TM}(k)}{\dot{Q}_{TM}^{nom}}$$

in which
   $t_{discharge}$ is the discharge time,
   $Q_{TM}(k)$ is the size of the test mass charge,
   $\dot{Q}_{TM}^{nom}$ is the nominal discharge rate.

5. The process according to claim 4, wherein for maximizing the nominal discharge rate, one constant voltage respectively is applied to at least some of the first electrodes, so that a potential difference formed between the respective electrode and the test mass is greater than or equal to a predefined potential threshold value.

6. The process according to claim 5, wherein:
   at least one of the test mass, the electrode casing, and the electrodes is irradiated by the light-emitting elements for a minimum time duration; and
   first electrodes to which a constant voltage is applied are irradiated by the light-emitting elements with less UV light in comparison to others of the first electrodes.

7. The process according to claim 3, wherein:
   for the determination of the nominal discharge rate, the potential of the test mass is determined, in addition to the size of the test mass charge and the charges of the capacitors formed between the first electrodes and the test mass; and
   the voltage applied to the second electrodes as well as a respective capacitance of the second electrodes are taken into account.

8. The process according to claim 7, wherein for determination of the potential difference between a respective electrode and the test mass, a change of the test mass potential because of the high-frequency alternating voltage applied to a second electrodes is taken into account, from which a derived discharge rate is determined.

9. The process according to claim 8, wherein the derived discharge rate is calculated by integration of a nominal discharge rate as a function of changing potential differences and the period of the high-frequency alternating voltage which is applied to the two electrodes.

10. The process according to claim 8, wherein the derived discharge rate is adapted by at least two successively determined test mass charges.

11. The process according to claim 8, wherein a derived discharge time is determined from the determined discharge time and the derived discharge rate ($\dot{Q}$_TM_real).

12. The process according to claim 1, wherein a differentiation is made between a positive and a negative discharge rate.

13. A computer program product encoded with machine-readable program commands for a control unit of a data processor which cause the latter to implement a process for discharging a test mass that is free-floating inside a surrounding electrode casing on board a satellite, the electrode casing having at least one first electrode for applying electrostatic forces or moments to the test mass and for the electrostatic measurement of the position or orientation of the test mass; at least one second electrode for modulating, particularly high-frequency, alternating voltages for measuring purposes on the test mass; at least one light-emitting element, which irradiates at least one of the test mass, the electrode casing, and the electrodes with ultraviolet light, to generate a photoelectric effect; said processing comprising automatically and iteratively:
   determining a test mass charge of the test mass; and
   performing a control operation to eliminate the determined test mass charge, until the test mass charge has reached a defined target value.

14. A system for discharging a test mass that is free-floating inside a surrounding electrode casing on board a satellite, the electrode casing enclosed by a vacuum tank having:
   at least one first electrode for applying at least one of electrostatic forces and/or moments to the test mass;
   at least one second electrode for modulating, particularly high-frequency, alternating voltages for measuring purposes onto the test mass; and
   at least one light-emitting element, which irradiates at least one of the test mass, the electrode casing, and the electrodes with ultraviolet light for generating a photoelectric effect;
   wherein the system has devices for the implementation of a process for discharging a test mass that is free-floating inside a surrounding electrode casing on board a satellite, the electrode casing having at least one first electrode for applying electrostatic forces or moments to the test mass and for the electrostatic measurement of the position or orientation of the test mass; at least one second electrode for modulating, particularly high-frequency, alternating voltages for measuring purposes on the test mass; at least one light-emitting element, which irradiates at lest one of the test mass, the electrode casing, and the electrodes with ultraviolet light, to generate a photoelectric effect; said processing comprising automatically and iteratively:

determining a test mass charge of the test mass; and
performing a control operation to eliminate the determined test mass charge, until the test mass charge has reached a defined target value.

* * * * *